ically compensates for the variations in the
UNITED STATES PATENT OFFICE.

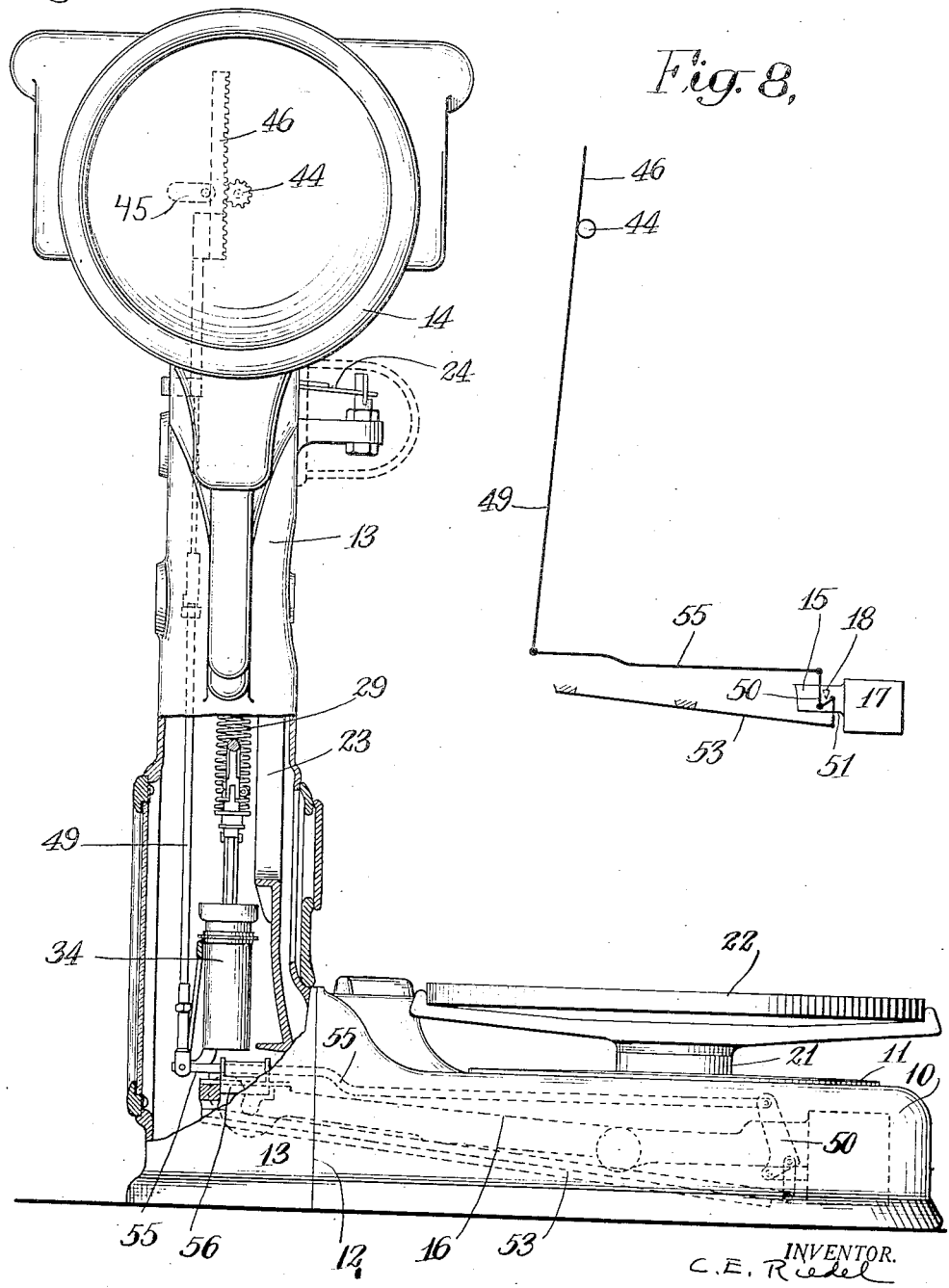

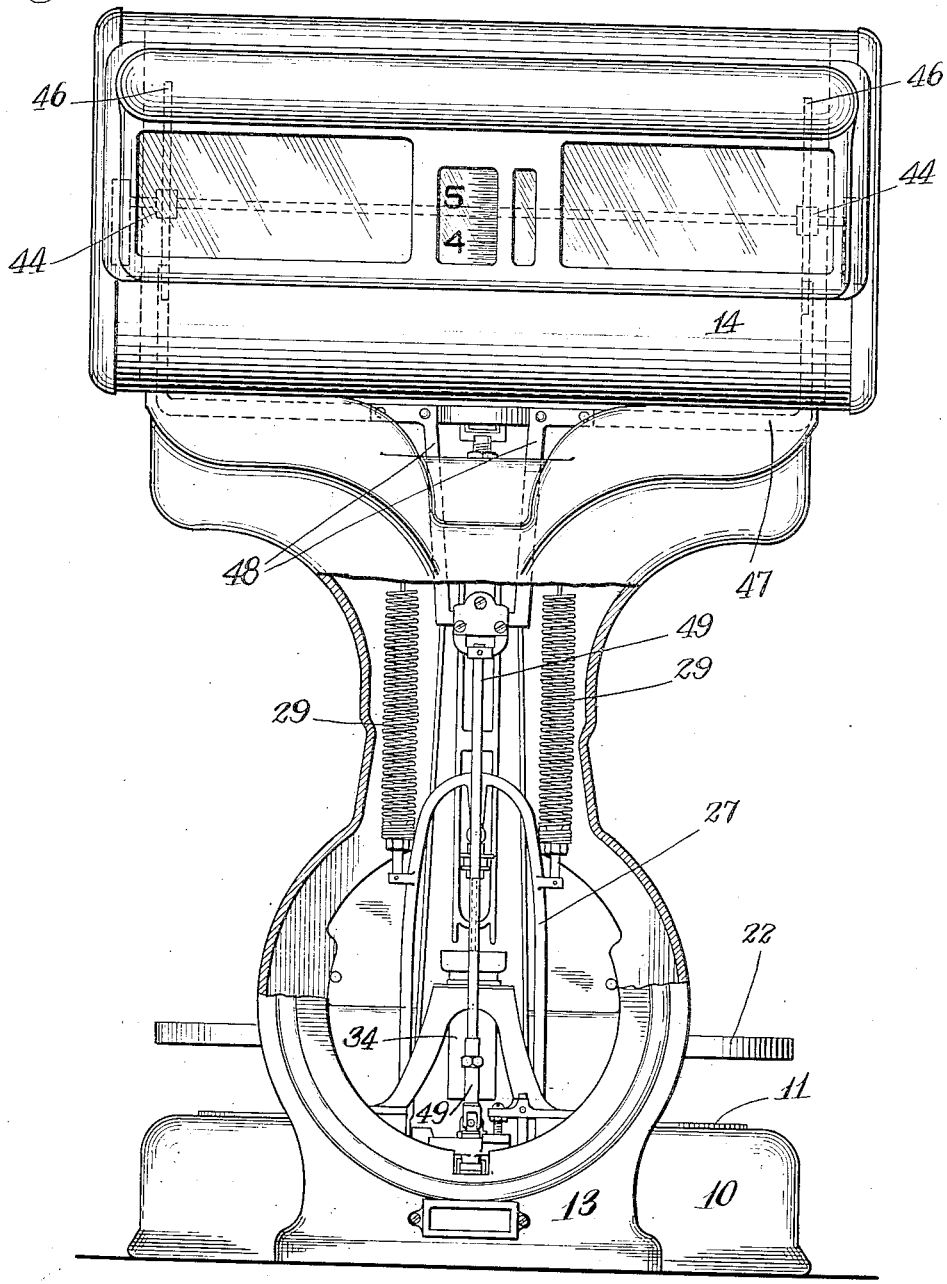

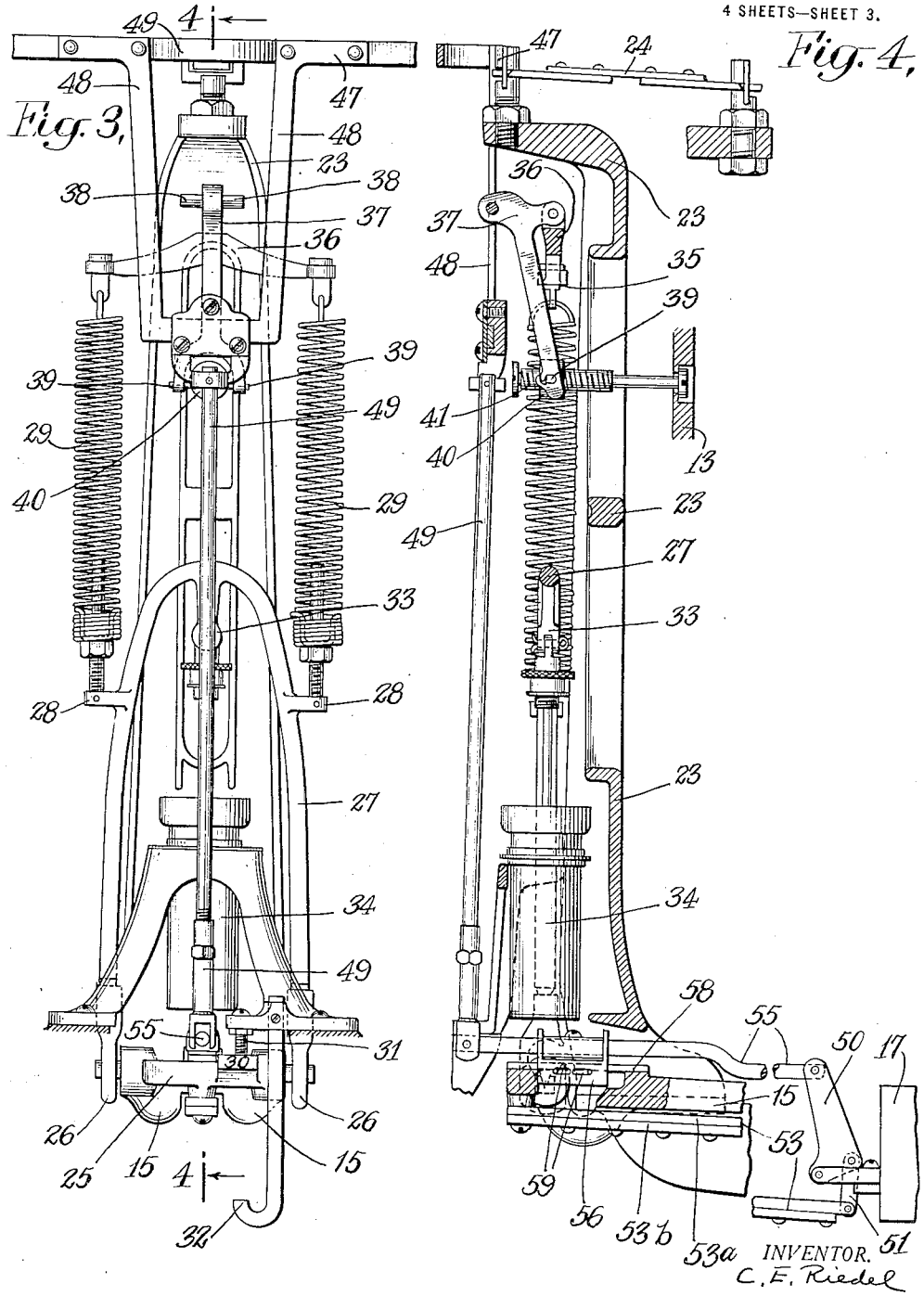

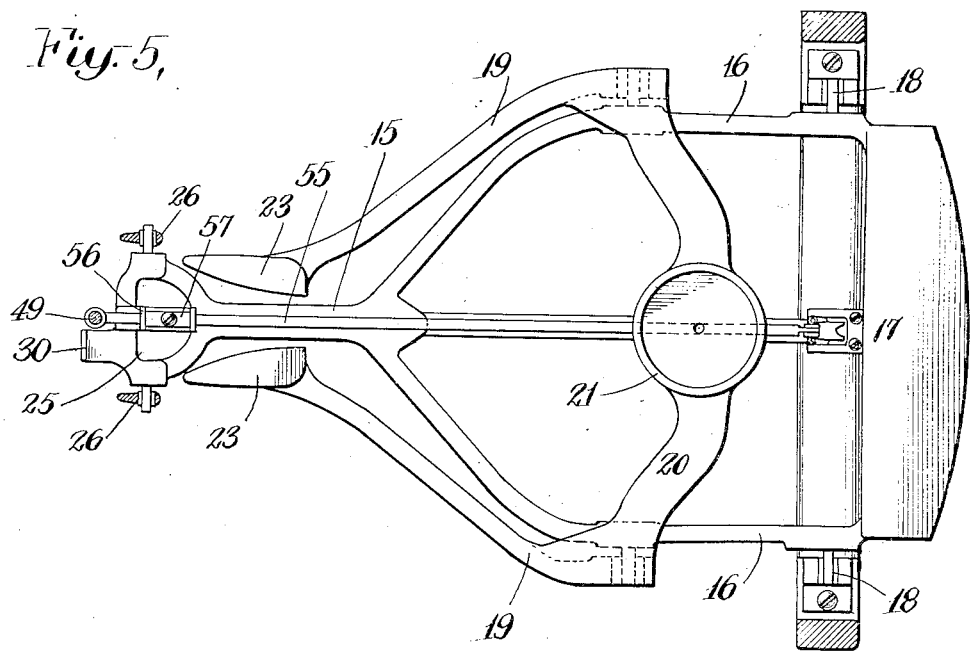
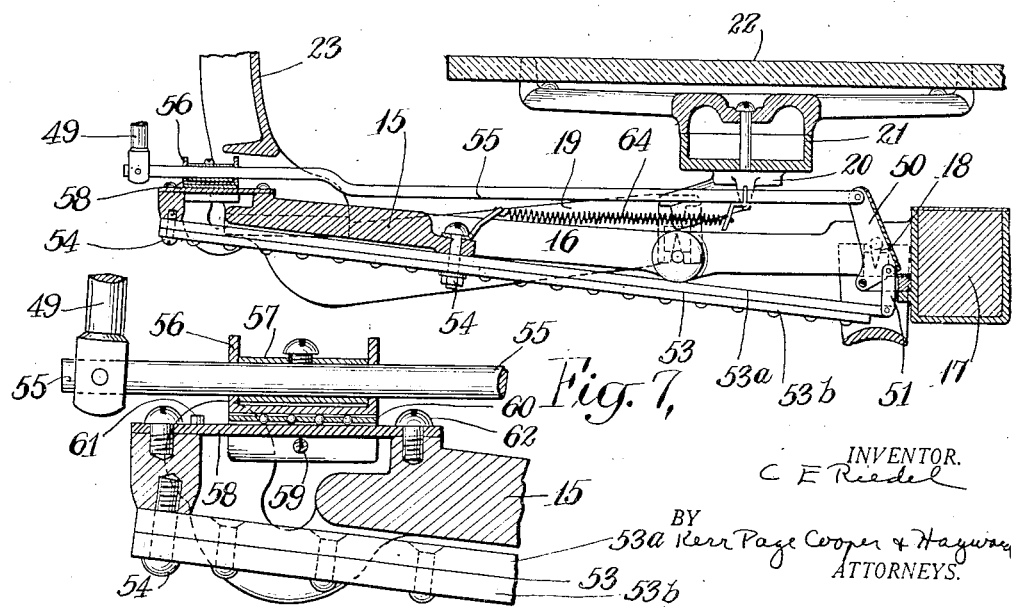

CHARLES EDWARD RIEDEL, OF DETROIT, MICHIGAN, ASSIGNOR, BY MESNE ASSIGNMENTS, TO DETROIT AUTOMATIC SCALE COMPANY, OF DETROIT, MICHIGAN, A CORPORATION OF INDIANA.

SCALE.

1,355,499.  Specification of Letters Patent.  Patented Oct. 12, 1920.

Application filed July 28, 1916. Serial No. 111,936.

*To all whom it may concern:*

Be it known that I, CHARLES EDWARD RIEDEL, a citizen of the United States, residing at Detroit, in the county of Wayne and State of Michigan, have invented certain new and useful Improvements in Scales, of which the following is a full, clear, and exact description.

This invention relates to certain new and useful improvements in scales.

The objects of this invention reside in the provision of a scale in which the operating parts are entirely inclosed and protected from dust and tampering by unauthorized persons; second in the provision of an improved arrangement of the operating parts, whereby they may be disposed compactly within the casing, third is the provision of an improved thermostat which automatically compensates for the variations in the springs due to changes in temperature. The thermostat is, adapted to compensate both for zero balance and load balance. A fourth object resides in the provision of means to make the thermostat extremely sensitive.

Other objects of the invention will be set forth in detail in the accompanying specification, shown in the drawings and more particularly pointed out in the appended claims.

Figure 1 shows a side elevation of the scale, certain parts being broken away to show the operating connections between the springs, the lever and the drum.

Fig. 2 is a rear elevation of the scale, certain portions of the case are broken away to show the moving parts in the interior of the column.

Fig. 3 is a detail enlarged view of the parts shown in Fig. 2.

Fig. 4 is a side elevation of the parts shown in Fig. 3. Certain parts are shown in central section.

Fig. 5 is a plan view of the lever system in the base of the scale. This view also shows certain of the operating connections for the thermostat.

Fig. 6 is a central sectional view of the parts shown in Fig. 4 together with the scale platform. This view shows the thermostat operating parts.

Fig. 7 shows an enlarged view of certain of the operating parts for the thermostat and particularly the parts used in minimizing friction in the connections to the rack bars.

Fig. 8 is a diagrammatic view showing the mode of operation of the thermostat and its control over the rack bars both for zero balance and for load balance.

In more detail, in the drawing the frame or housing of the scale, comprises three main parts, the base, the column or pedestal and the chart housing. The base of the scale 10 and the base cover 11 are of such construction that the operating levers and associated mechanism are completely inclosed therein. In this way dirt is prevented from getting into the bearings and tampering with the working parts by unauthorized persons is prevented. The base terminates at the rear in a straight flat vertical surface 12, to which surface the column or pedestal 13, of the scale is securely bolted. By permitting the column to extend down to the bottom of the base in this manner a greater clamping surface is obtained than in previous constructions. This gives a more rigid construction and improves the general appearance of the scale. The pedestal or column 13 is surmounted by the chart housing 14, in the usual manner.

*Lever system and check construction.*

The scale lever 15 is substantially of Y shape having forked ends 16 connected by a cross bar 17 which forms a counterweight for the lever. The lever carries the usual downwardly facing knife edges 18 resting in agate fulcrum bearings, carried by a bracket supported upon the base of the scale and also has upwardly pointing knife edges which coöperate with suitable agate bearings carried by the platform support 19. This platform support is V-shaped and straddles the Y-shaped main lever as shown in Fig. 5. The cross member 20 of the platform support carries a cylindrical member 21 which extends through a circular hole in the base cover 11 and supports the platform 22 in the usual manner. By reason of the straddling construction of the platform support the base system is extremely compact and at the same time ample room is left between the forks of the main lever for supplementary devices such as the thermostat. The platform support at the rear thereof extends upwardly into the column of the scale, as shown at 23, and this vertical pedestal portion of the support has at its upper end the usual over-head check 24, which serves to maintain the platform in horizontal position, see Figs. 1, 4 and 6. The forward end of the check is preferably covered with a cap as best shown in dotted lines in Fig. 1.

*Connections to springs.*

The rear end of the main lever is bifurcated, as shown at 25 in Fig. 5. Projecting outwardly from these bifurcations are downwardly pointing knife edges which rest in bearings in the lower ends 26, of an inverted U-shaped member 27. The inverted U-shaped piece 27 carries lugs 28, to which the springs 29 are attached, preferably by the screw threaded adjustable connection shown in Fig. 3. The rear end of the lever 15 carries a nose 30, which coöperates with an adjustable screw 31 and a fixed stop 32, the former limiting the extreme upward movement of the lever and the latter limiting the extreme downward movement of the lever, see Fig. 3. Depending downwardly from the inverted U-shaped piece 27 is an extension 33, to which the plunger of a dash pot 34 is pivotally attached. The dash pot serves to dampen the vibrations of the beam. The upper end of the springs is connected to an equalizer bar 35 which bar is pivotally connected with a link 36 which in turn is pivotally connected with a bell crank 37 which is pivotally supported upon a bracket (not shown but projecting from the column 13) by means of the studs 38. The lower end of the bell crank 37 is bifurcated as shown in Figs. 3 and 4 and these bifurcations receive pins 39 which project from a nut 40. A threaded stud 41 engages the threads of this nut and has a long shank which projects outwardly through the wall of the column 13 and is screw slotted at the end thereof as shown in Fig. 4. By means of a screw driver this stud may be turned and the bell crank rocked. In this way the springs 29 and the power end of lever 15 are raised or lowered thereby providing a zero setting for the parts operating in unison therewith. It will be understood that this zero adjustment is made from outside of the case and without disturbing any of the parts of the scale. Usually to prevent unauthorized tampering with the zero adjustment the head of the stud is covered with a removable plate carried by the column.

*Thermostat and connections to the indicating drum.*

The indicating drum is of the usual form having price graduations and weight graduations thereon. The drum is suitably journaled in the chart housing 14 at the top of the machine and carries at each end pinions 44 which intermesh with rock bar 46. The racks 46 are held in engagement with the pinions 44 by the adjustable guide blocks 45 as shown in dotted lines Fig. 1. The rack bars are both rigidly secured to a cross bar 47 which bar has a downwardly depending part 48 and a curved bridge piece to clear the overhead check. To the parts 47 a draft rod 49 is secured. This draft rod does not extend directly vertical, but is slightly inclined, see Fig. 4. The assembly, comprising draft rod 49, parts 48, 47, and rack bars 46, forms one rigid unit and eliminates the usual equalizing bar below the racks.

When springs are used in scales it is well known that they are subject to variations under varying temperatures. The springs stiffen and shorten at low temperatures and elongate and become more flexible at high temperatures. The variation is so great that normal working temperatures in summer and winter will affect the accuracy of the scale. It is therefore necessary to compensate in some way for the temperature effect. The compensation should be automatic and should take into consideration both the expansion and contraction of the springs which affects the zero balance of the scale and also the hardening and softening of the wire which affects the load balance. The termostat device which effects the automatic regulation should also be arranged so that the minimum of load and friction comes upon it. This automatic compensating device will now be described.

Pivotally attached to the front end of the main lever, preferably, to the cross member 17 near the center thereof, is a bell crank 50, see Figs. 4 and 6. To this bell crank is attached a link 51 which connects with the end of a thermostatic bar 53. The bar 53 is built up of two different metals 53$^a$ and 53$^b$ having varying coefficients of expansion. These strips are both riveted together, as shown, and are also secured by screws 54 to the rear end of the main lever, as clearly shown in Fig. 5. Under varying temperature conditions the thermostatic bar 53 will bow to a greater or less extent, thereby, through link 51, rocking the bell crank 50 to a greater or less extent. There is also pivotally attached to the bell crank a bent rod 55 which extends rearwardly, and has near its end a pivotal connection with the draft rod 49, see Figs. 4, 6 and 7. In order to support the rear end of the bent rod 55 and to permit this rod to move back and forth relatively to the scale lever 15 with a minimum friction, I provide a saddle 56 which saddle is drilled to receive the rod 55 and which has a spacing member 57 locked in position by a set screw, as shown in Fig. 7. The saddle, it will be understood, moves in unison with the bent rod. The saddle extends down at the sides of a plate 58, which plate bridges the bifurcated rear portion 25 of the main lever and is secured thereto by screws. A cotter 59 holds the saddle in position on the plate and a ball cage plate 60 is disposed between the bottom of the saddle and the top of the plate 58. The balls in this cage permit the saddle to move freely on the supporting plate with a minimum of friction. The ball cage is limited in its extreme movements by means of a pin 61 and the screw 62. The bent rod 55 is normally held to the left by a tension spring 64 and at the rear end pivotally connects with the draft rod 49. This draft rod extends upward from the pivotal connection with rod 55 and makes an acute angle with the said rod. The object of this acute angle will be hereafter explained.

The operation of the thermostat will be explained particularly with reference to the diagrammatic view Fig. 8. Similar reference characters are applied to the corresponding links in this view as in the other figures. By referring to Fig. 6 it will be seen that the bent rod 55 will move upward and downward in unison with scale lever 15. The rod 55 will move draft rod 49 up and down and will also move the racks 46 and pinion 44 thus moving the indicating drum. Now if the thermostat bar 53 bows downwardly bell crank 50 will be rocked clockwise and rod 55 will be drawn toward the right. Rod 55 will draw the lower end of the draft rod 49 to the right and the angle between rods 55 and 49 will tend to approach a right angle. The effect of this change of angle is to elevate the upper end 46 (rack bars) of rod 49 and thus turn the pinions 44 and the indicating drum. It will be understood that when the thermostat bar straightens, the parts will move in the opposite direction and the drum will be turned in the opposite direction. This thermostatic control makes the zero balance of the drum correct at all temperatures notwithstanding an elongation or contraction of the load springs. The load balance which varies under varying temperatures by reason of the varying stiffness of the springs is compensated for by the varying effective lever arm acting in coöperation with the draft rod. It will be readily understood that the distance between the connection of 49 and 55 and the knife pivot 18 varies according to the displacement of the thermostatic bar 53. This varying lever arm is calculated to correct the movement of the drum in accordance with variations in load balance as will be readily understood. The present construction eliminates a large part of the friction load which has usually come upon the thermostat as the direct tension of the springs does not come upon the thermostat at all. The thermostat merely moves a light draft rod and the saddle construction cuts down the friction to a minimum. At the same time the number of parts is reduced to a minimum and manufacturing is simplified.

It is to be understood that the invention is not limited to the precise construction shown and described as various modifications may be made which will occur to those skilled in the art. What I claim as my invention is more partcularly pointed out in the appended claims.

I claim:

1. In a scale, in combination, a base; a base cover; a substantially Y-shaped scale lever pivoted within the base; a platform support of V-shape, having one portion straddling the said scale lever and side portions pivoted to the arms of the scale lever on the outside thereof, said side portions extending along the outside of the arms of the scale lever whereby the space between the arms of the scale lever is left clear; and means connected to the platform support at the rear end thereof to maintain the platform support horizontal.

2. In a scale, in combination with a base; a base cover; a scale lever pivoted within the base and having substantially a Y-shape, a platform support of V-shape having one portion straddling the scale lever and side portions pivoted to the Y-arms of the said lever on the outside thereof, said V portions extending along the outside of the Y portion of the lever, whereby the space between the Y arms of the scale lever is left clear for other mechanism.

3. In a scale in combination, a base and a base cover plate removably secured thereto, said base having a tapering rear portion, a pedestal bolted to the tapered rear portion of the base and substantially coextensive therewith and extending downward to the bottom of the base and a drum housing on the top of the pedestal, substantially as described.

4. In a scale, in combination, a main lever, a weight indicator, a draft rod to operate the same, an automatic temperature compensating device carried by the main lever, said device comprising a thermostatic bar secured at one end to the lever, a bell crank pivoted on the lever, a connection intermediate the free end of the bar and said bell crank; and a second connecting member intermediate the bell crank and the draft rod, and a ball bearing support for said second mentioned connecting member whereby said member may move freely under the control of the thermostat.

5. In a scale, in combination, a main lever, a weight indicator, a draft rod to operate the same, an automatic temperature compensating device carried by the main lever, said device comprising a thermostatic bar secured at one end to the lever and connected at the opposite end to a bell crank pivoted upon the lever, a rod connecting the bell crank and the draft rod, said rod and draft rod varying in relative angularity under varying temperature conditions and thereby maintaining a proper zero balance of the weight indicator, said rod being also adapted to vary the effective lever arm acting to move the draft rod whereby a proper load balance is maintained at varying temperatures.

6. In a scale, in combination, a main lever, a weight indicator, a draft rod to operate the same, an automatic temperature compensating device carried by the main lever, said device comprising a thermostatic bar secured at one end to the lever and connected at the opposite end to a bell crank pivoted upon the lever, a rod connecting the bell crank and the draft rod, said rod and draft rod varying in relative angularity under varying temperature conditions and thereby maintaining a proper zero balance of the weight indicator, said rod being also adapted to vary the effective lever arm acting to move the draft rod whereby a proper load balance is maintained at varying temperatures, and a ball bearing support for the rod connecting the bell crank and the draft rod whereby the said rod may move freely with a minimum of friction.

7. In a scale in combination, a main scale lever, a platform thereon, a weight indicator, a draft rod to operate the said indicator, weight-resisting springs connected to the main scale lever and independent of the draft rod, a thermostatically controlled member adapted to vary the connection between the draft rod and the lever to maintain correct zero and load balance at varying temperatures, said member having a ball bearing mounting upon the main scale lever whereby it can move freely relatively thereto with a minimum of friction and drag.

8. In a scale, in combination, a main scale lever adapted to support a platform, a loop shaped member pivotally connected to the rear end thereof, weight resisting springs directly connected with said loop shaped member, a weight indicator, a draft rod to move said indicator, said draft rod moving in unison with the scale lever and having a connection therewith independent of the spring connection with the lever.

9. In a scale, in combination, a main scale lever adapted to support a platform, a loop shaped member pivotally connected with the rear end of the lever, weight-resisting springs directly connected with the loop shaped member, a dash pot connected to said member to dampen vibrations, a weight indicator, a draft rod to operate the said indicator, compensating means for operating the draft rod in unison with the scale lever, said compensating means being independent of the spring connection to the lever.

10. In a scale, in combination, a main scale lever adapted to support a platform, a plurality of load springs pivotally connected to the rear end of the said lever, a weight indicator, a draft rod to operate the same, means independent of the spring connection with the lever for operating the draft rod in unison with the said lever and means associated with the aforesaid means for varying the connection between the lever and the draft rod in accordance with varying temperatures, and adjusting means for varying the initial position of the springs and for thereby bringing the scale to zero balance.

11. In a scale, in combination, a main scale lever, a weight indicating drum, pinions on the ends of the said drum, a draft rod operatively connected with the scale lever and having an upper integral bifurcated portion secured thereto and racks on each of the bifurcations adapted to mesh with the pinions and move the drum in unison with the movement of scale lever.

12. In a scale, in combination, a base, a pedestal, a main scale lever within the base adapted to support a platform, a plurality of load springs connected to the rear end of said lever and extending upwardly in said pedestal, a weight indicator, a draft rod to operate the same, means independent of the spring connection with the lever for operating the draft rod in unison with the said lever, a casing surrounding the aforesaid mechanism and an adjusting means projecting through the pedestal for varying the initial position of the springs to thereby position the weight indicator at correct zero balance.

13. In a spring scale, in combination with a scale lever, a weight indicator, an operating member therefor, a thermostatic device mounted on the scale lever and adapted to vary the relative angularity of the operating member and the scale lever at varying temperatures to thereby maintain correct zero balance, and means intermediate the thermostat and the operating member for multiplying the movement imparted to the operating member by the thermostat.

14. In a spring scale, in combination with a scale lever, a weight indicator, an operating member, a thermostat device mounted on said lever and adapted to vary the effective lever arm acting on the operating member and having provisions for varying the angularity of the operating member and the scale lever and solely by the change in such angularity to maintain correct zero balance of the weight indicator at varying temperatures.

15. In a spring scale, in combination with a scale lever, a weight indicator, an operating member, a thermostat mounted upon the scale lever and connected with the operating member, means intermediate the thermostat and the operating member to increase the effective movement of the operating member imparted thereto by the thermostat, said thermostat being adapted to vary the effective lever arm acting upon the operating member and to vary the angularity of the operating member and the scale lever and solely by said change of angularity to maintain the weight indicator at correct zero balance.

In testimony whereof I affix my signature in the presence of two subscribing witnesses.

CHARLES EDWARD RIEDEL.

Witnesses:
 R. G. BLUTH,
 W. V. LE BARON.